United States Patent
Suggs et al.

(10) Patent No.: US 6,845,983 B1
(45) Date of Patent: Jan. 25, 2005

(54) GASKET WITH OUTER EDGE DAMPING CHANNEL AND METHOD AND APPARATUS FOR MANUFACTURING SAME

(75) Inventors: Steven M. Suggs, Nacogdoches, TX (US); Thomas R. Smith, Nacogdoches, TX (US)

(73) Assignee: Acadia Elastomers Corporation, Nacogdoches, TX (US)

( * ) Notice: Subject to any disclaimer, the term of this patent is extended or adjusted under 35 U.S.C. 154(b) by 0 days.

(21) Appl. No.: 10/243,638

(22) Filed: Sep. 13, 2002

(51) Int. Cl.[7] .................... F16L 17/00; F16L 33/18; F16J 15/20
(52) U.S. Cl. ............... 277/314; 277/637; 277/628; 285/355
(58) Field of Search .................. 277/628, 638, 277/639, 650, 652, 654, 591–598, 314, 602, 603, 606, 608, 609, 611, 616; 285/355, 910

(56) References Cited

U.S. PATENT DOCUMENTS

| | | |
|---|---|---|
| 222,388 A | 12/1879 | Doty |
| 843,394 A | 2/1907 | Haynes |
| 854,135 A | 5/1907 | Whittemore |
| 922,130 A | 5/1909 | Coetze |
| 1,030,055 A | 6/1912 | Darlington, Jr. |
| 2,126,716 A * | 8/1938 | Balfe .................... 277/601 |
| 3,163,431 A | 12/1964 | Tanner .................. 277/211 |
| 3,230,290 A * | 1/1966 | Nelson et al. ........... 277/652 |
| 3,404,061 A | 10/1968 | Shane et al. ............ 161/125 |
| 3,542,382 A | 11/1970 | Hagmann ............... 277/211 |
| 3,781,043 A | 12/1973 | Hagmann ............... 285/363 |
| 3,837,657 A | 9/1974 | Farnan et al. ............. 277/1 |
| 4,095,809 A * | 6/1978 | Smith .................... 277/611 |
| 4,333,975 A | 6/1982 | Booth .................... 425/65 |
| 4,432,408 A | 2/1984 | Caines ................... 165/1 |
| 4,705,278 A | 11/1987 | Locacius et al. ......... 277/235 |
| 4,799,956 A | 1/1989 | Vogel .................... 75/243 |
| 4,810,454 A | 3/1989 | Belter ................... 264/271 |
| 4,822,062 A * | 4/1989 | Gallo et al. ............. 277/592 |

(List continued on next page.)

FOREIGN PATENT DOCUMENTS

| | | |
|---|---|---|
| DE | 3309341 | 6/1984 |
| DE | 3348345 | 12/1984 |

OTHER PUBLICATIONS

Calgraph Technical Manual, Polycarbon, Inc., Valencia, CA, p 1, 3.1, 3.2, 4.1, 4.2, 25.1, 25.2, 25.4, 25.5, Jul. 1, 1993.
Grafoil Engineering Design Manual, vol. 1, Union Carbide p. 3, 4, 7, 9, 10, 14.
Elastagraph Gaskets/QuadraGraph Gasket Material; JM Clipper, Acadia Elastomers Corporation, Nacogdoches, TX.
Sealing surfaces, text p. 2–13 and 2–14 (at least as early as one year prior to filing date).
Metallic Jacketed Gaskets, Technical Data Sheets, Leader Gasket, Inc., Baton Rouge, LA. pp. 3–1—3–4; 4–1.

(List continued on next page.)

*Primary Examiner*—Alison Pickard
*Assistant Examiner*—Vishal Patel
(74) *Attorney, Agent, or Firm*—Baker, Donelson, Bearman, Caldwell & Berkowitz

(57) ABSTRACT

A gasket (10) for sealing flange connections in piping systems for media, while changing a natural frequency of the gasket to avoid resonance in the flange connection, comprising a plate (12) that defines a opening (14) for passage of media through the flange connection sealed with the plate, with opposing sealing surfaces (18) between an edge (20) of the opening and an outer perimeter edge (22) of the plate, and a channel (26) received around an outer perimeter edge of the plate and unloaded in the flange connection whereby the channel being unloaded but in engagement to the plate changes a natural frequency of the plate to avoid resonance in the flange connection.

10 Claims, 3 Drawing Sheets

U.S. PATENT DOCUMENTS

| | | | | |
|---|---|---|---|---|
| 4,895,713 A | | 1/1990 | Greinke et al. | 423/448 |
| 5,421,594 A | * | 6/1995 | Becerra | 277/608 |
| 5,431,418 A | * | 7/1995 | Hagiwara et al. | 277/592 |
| 5,472,214 A | * | 12/1995 | Wainer et al. | 277/609 |
| 5,558,347 A | * | 9/1996 | Nicholson | 277/652 |
| 5,785,322 A | | 7/1998 | Suggs et al. | 277/207 A |
| 5,797,982 A | | 8/1998 | Suggs et al. | 118/304 |
| 6,367,803 B1 | * | 4/2002 | Loth | 277/321 |
| 6,457,726 B1 | * | 10/2002 | Jung | 277/611 |
| 6,540,852 B1 | | 4/2003 | Suggs et al. | 156/62.2 |
| 6,565,099 B1 | * | 5/2003 | Ottinger et al. | 277/608 |

OTHER PUBLICATIONS

Flexitallic Single and Double–Jacketed Gaskets Metallic and Non–Metallic Gaskets, Flexitallic Gasket Company Inc., Bellmawr, NJ 08031.

Flexitallic Special Heat Exchanger Gaskets, Flexitallic Gasket Company Inc., Bellmawr, NJ 08031.

Flexitallic Carrier Ring Gaskets, Flexitallic Gasket Company Inc., Bellmawr, NJ 08031.

* cited by examiner

GASKET WITH OUTER EDGE DAMPING CHANNEL AND METHOD AND APPARATUS FOR MANUFACTURING SAME

TECHNICAL FIELD

The present invention relates to gaskets for sealing flange connections. More particularly, the present invention relates to gaskets having an outer edge channel that seal flange connections while changing the natural frequency of the gasket to avoid resonance in the flange connection, particularly resulting from uneven flange loading, and to apparatus and methods for the manufacture of such gaskets.

BACKGROUND OF THE INVENTION

Modern industrial plants, especially those for processing chemicals, petrochemicals, and the like, have large numbers of interconnected pipes. These pipes communicate media such as fluidal liquids and gases for processing in the plants. The media carried in the processing plant pipes are typically at high temperatures and/or high pressures.

Adjacent longitudinally aligned sections of pipe connect together at junctions with bolts that extend through aligned bores in the facing flanges at the ends of the respective pipes. A resilient material, or gasket, is typically disposed between the parallel mating faces of the flanges of the pipes to be joined together. The gasket seals the interconnection between the adjacent pipes to restrict media leakage from between the flanges forming the connection between the pipes. Generally the flanges interconnect together by a plurality of bolts that pass through bores in the flanges. The bolts are secured by nuts, in order to join the pipes tightly together. The number and spacing of bolts and the geometric arrangement of the bolts around the flanges depends primarily on the diameter of the pipes and the pressure of the media flowing through the pipes and the flange connection.

As described above, gasket materials are used to seal the connection between the two flanges. Gaskets effect seals by deforming and filling the surface irregularities in the faces of the flanges. The gasket is compressed between the parallel faces of the flanges. The internal pressure of the media flowing through the flange joint attempts to blow out the gasket from between the flange faces. Hydrostatic end force, which originates with the pressure of the confined fluid, also attempts to separate the flange faces. The torqued bolts and nuts securing the flanges together resist these forces while holding the flanges together with the gasket compressed between the faces of the flanges for sealing the connection from leaks.

There are a number of known types of gaskets for sealing the flange connection. These gasket types include o-rings, plate-like gaskets or spiral wound, and gaskets cut from sheets. The pre-cut gaskets are particularly useful for forming gaskets of irregular sizes and during emergency situations requiring a temporary gasket.

Maintenance personnel use sheet gasket material to cut a gasket to fit a particular application. For many years, the primary type of sheet packing was asbestos fiber sheet having elastomeric or rubber binder. Due to environmental concerns, asbestos has generally been removed from the market and the packing industry has sought suitable substitute materials which take into account the pressure, temperature, and chemical requirements of gasket applications. One known sheet packing is graphite paper or sheet graphite. Graphite sheet is formed from intercalated flake graphite which is expanded into worms, or vermiform, and then calendared into thin, usually high density sheets of graphite. Intercalated flake graphite is formed by treating natural or synthetic graphite flake with an intercalating agent such as fuming nitric acid, fuming sulfuric acid, or mixtures of concentrated nitric acid and sulfuric acid. The intercalated flake graphite is then expanded at high temperatures to form a low-density, worm-like form of particulate graphite having typically an eighty-fold increase in size over the flake raw material.

The production of intercalated flake graphite is an intermediate step in the production of expanded intercalated graphite as described in U.S. Pat. No. 3,404,061. Expanded intercalated graphite particles have thin structural walls and are light-weight, puffy, airy, and elongated worms or vermiform. For some gasket applications, the calendared graphite sheet overlays a metal blank having an annular opening which aligns with the pipes to be sealed. The graphite sheet is coated with an adhesive for adhering the sheet to the metal blank. The sheet is cut to form the opening through the gasket. For other applications, the calendared graphite sheet is cut to the particular size and shape of the flanges to be sealed. As discussed above, the flanges are bolted together and compress the gasket between the faces of the aligned flanges for sealing the joint.

Sealability is an important physical characteristic indicative of whether a gasket material will function properly. The American Society of Testing and Materials provides a test designated F37 for evaluating the fluid sealing properties of gasket materials. When ASTM F37 is used as an acceptance test, generally sealability is evaluated with test conditions agreed upon by the manufacturer of the gasket material and the customer planning to use the gasket material in a sealing application. These test conditions include the fluid to be sealed, the internal pressure of the fluid, and the flange load. Gaskets are conventionally tested for comparison purposes with nitrogen gas at an internal pressure of pounds per square inch and a flange load of 3,000 pounds per square inch, pursuant to ASTM F37. Measurement of the Leakage rates at these conditions allow comparing one gasket material with another. The report on ASTM designation F37 explains that the question is not whether a particular gasket material allows leakage, but rather how much leakage occurs with a given set of conditions of time, temperature, and pressure. The leakage measured comes either through the gasket, between the gasket and the flange faces, or both. The ASTM report states that experience shows that in most cases, the leakage measured is a result of leakage through the gasket.

While gaskets formed from calendared graphite sheet material generally perform satisfactorily for sealing in high-temperature and high-pressure environments, the graphite sheet material has drawbacks that limit its use in large industrial facilities. One problem with flexible graphite is vibration which results in the gaskets metal substrate breaking due to metal fatigue from harmonic resonance should the gasket have uneven loads applied on its installation. A system responds when it is encouraged to vibrate at a natural frequency. If a pulsating excitation is applied with a natural frequency, then a violent motion may be expected. This phenomenon is called resonant vibration. A forced vibration becomes significant only if resonance occurs. However, resonant vibration can lead to destruction of the mechanical system being vibrated. By way of example, it is noted that resonant vibrations has caused destruction of bridges and other structures. Indeed, vibrations are destructive to sealed flange connections as well. Vibration relates to gasket breakage in the following manners. Vibration can loosen even the tightest nut, sometimes in a matter of seconds. Loosened nuts lead to loss of seal on the connection and spillage of the media communicated through the pipe. Under high pressure and flow rate, the loss of seal may be destructive and dangerous to persons and equipment in the area. Further, vibration is associated with fluctuating stresses and, during sufficient violent motion, these fluctuations may become large enough for breakage of a gasket to occur. Catastrophic breakage of a sealing gasket as a result of resonant vibration can be quick and cleanly made, and these characteristics are aspects of fatigue failure. The flow of the media in the piping can act as an exciting source for the vibration. The flange connection located in proximity of a vibration generating source, some even hard to distinguish and identify for remedial measures, can cause resonant vibration to happen.

Efforts have been made to address this problem with damping or other methods, including decreasing the natural frequency by decreasing the stiffness/mass ratio; increasing friction and/or contact surfaces that rub together during vibration, such as with the addition of inner or outer guiderings; use of high damping material; sandwich construction of gaskets; adding vibration absorbers, such as polymeric material packing, if possible; and use of fasteners such slotted, castellated nuts or lock-nut. While these methods and structures have been used, they have riot resolved the problem presented by vibration stress on gasket-sealed flange connections.

In addition to vibration destruction of gaskets, flanged connections have other problems. In some instances, it is difficult to verify by visual inspection of the connection that the gasket remains properly seated for sealing the connection. Also, the type and character of the gasket is not readily determinable. In such circumstances, the connection often has to be broken apart with removal of the fastening bolts to verify proper gasket sealing and placement. This action however necessitates the installation of a new gasket, which is time consuming and may incur significant expenses such as downtime for the process communicating media through the connection as well as replacement gasket and materials expenses.

Accordingly, there is a need in the art for an improved gasket that seals flanged connections while changing a natural frequency of the gasket to avoid resonance in the flange connection, particularly resulting from uneven flange loading, and with increased visual verification of the seal, together with an apparatus and method of manufacturing improved flange connection gaskets. It is to such that the present invention is directed.

SUMMARY OF THE INVENTION

The present invention meets the needs in the art by providing a gasket for sealing flange connections in piping systems for communicating fluidal media while changing a natural frequency of the gasket to avoid resonance in the flange connection, comprising a plate that defines a opening therein for passage of the fluidal media through the flange connection sealed with the plate, with opposing sealing surfaces between an edge of the opening and an outer perimeter edge of the plate, and a channel secured around an outer perimeter edge of the plate.

Objects, advantages and features of the present invention will become apparent from a reading of the following detailed description of the invention and claims in view of the appended drawings.

DETAILED DESCRIPTION OF THE ILLUSTRATED EMBODIMENTS

Figure 1:
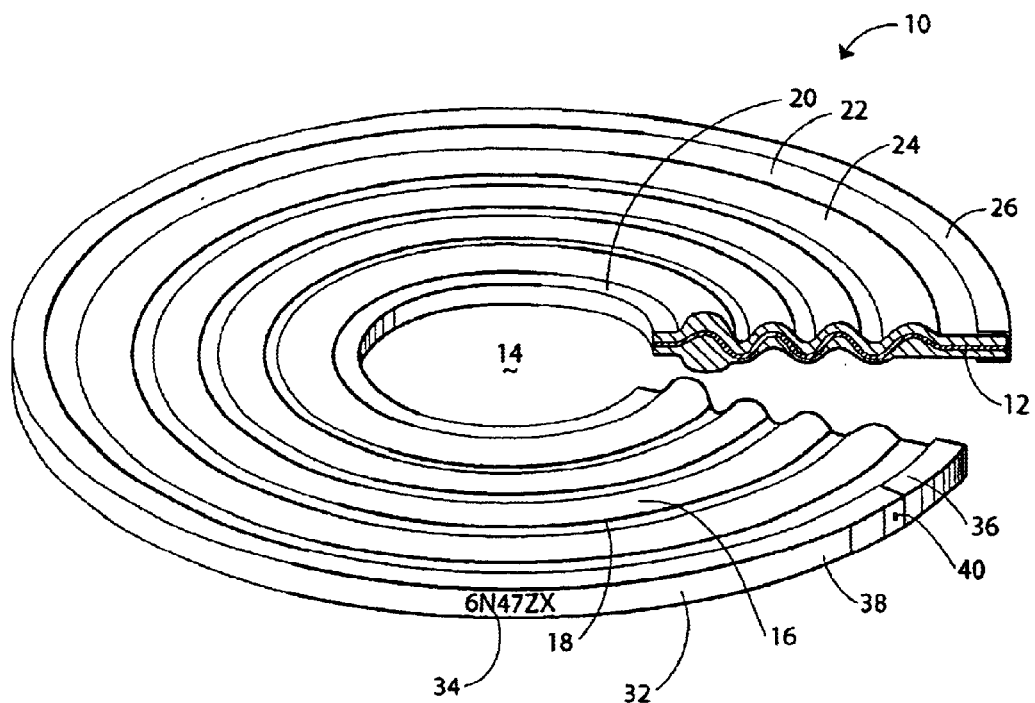
FIG. 1 is a perspective view of a gasket according to the present invention.
Figure 2:
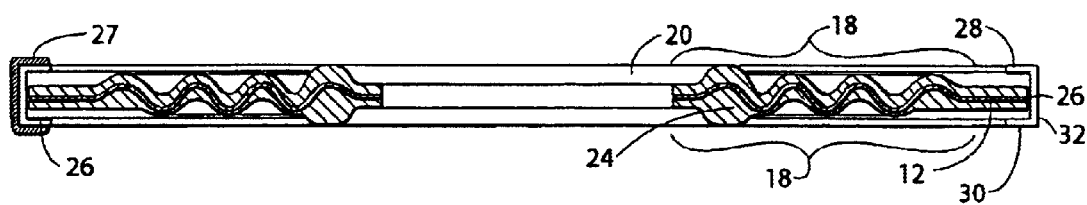
FIG. 2 is an enlarged cross-sectional view of the gasket illustrated in FIG. 1, exaggerated in a thickness direction for illustration purposes.

Referring row in more detail to the drawings in which like parts have like identifiers, FIG. 1 illustrates in perspective view a gasket 10 according to the present invention for sealing flange connections while changing a natural frequency of the gasket to avoid resonance in the flange connection, and FIG. 2 illustrates an enlarged cross sectional view of the gasket 10 illustrated in FIG. 1. It is to be noted that the view in FIG. 2 is enlarged relative to FIG. 1 and exaggerated in thickness for purposes of illustration. The gasket 10 according to the present invention includes a core or plate 12 that defines an opening 14 for communication of media through a flange connection sealed by the gasket 10. The plate 12 in the illustrated embodiment further includes a plurality of corrugations 16 in opposing sealing surfaces generally 18 extending between the edge 20 of the plate 12 at the opening 14 and an outward distal edge 22. Generally, between about 4 and 8 corrugations per inch, with 8 per inch generally preferred over 4 per inch. In the illustrated embodiment, the metal plate is 0.024 inches thick with corrugated heights peak-to-peak of 0.06 to 0.065 inches. In the illustrated embodiment, the sealing surfaces 18 are covered with a sealing material generally 24, such as an expanded intercollated graphite worms or graphite vermiform compressed together in situ on the plate 12 as a sealing material, as disclosed in U.S. patent application Ser. No. 09/119,984 filed Jul. 21, 1998, incorporated herein by reference, which discloses an apparatus for manufacturing a seamless gasket with expanded intercollated graphite worms, and the gasket resulting from such manufacturing apparatus provides a gasket plate 12 useful with the present invention, and no further disclosure is believed necessary for the manufacture of a gasket or a plate useful with the present invention. The overall gasket thickness peak-to-peak with the sealing material is between about 0.08 and 0.1 inches thick.

In addition, the gasket 10 includes a channel 26 received around the outer edge 22 of the plate 12. The channel 26 is U-shaped with opposing sides 28 and 30 extending from a base 32 disposed on the plate 12 to show an outer face about the perimeter of the gasket 10. In one embodiment, the channel 26 is painted to provide an identifying appearance for readily detecting the gasket when used for sealing a flange connection, as discussed below. In addition, the base 32 provides an outer surface on which indicia generally 34 can be printed. The indicia 34 can include a part number, identification of the type of sealing material, the gasket size, and like information. The channel 26 extends around the perimeter of the plate 12 and has overlapping distal ends generally 36, 38 which are joined together by a weld 40.

FIG. 2 further illustrates on the left side thereof an alternate embodiment, in which the channel 26 is covered with an exterior jacket 27 of a coating to have additional modifying effect on the natural frequency of the plate 12, as discussed below, such as rubber, a resilient material or other coating.

Figure 3:
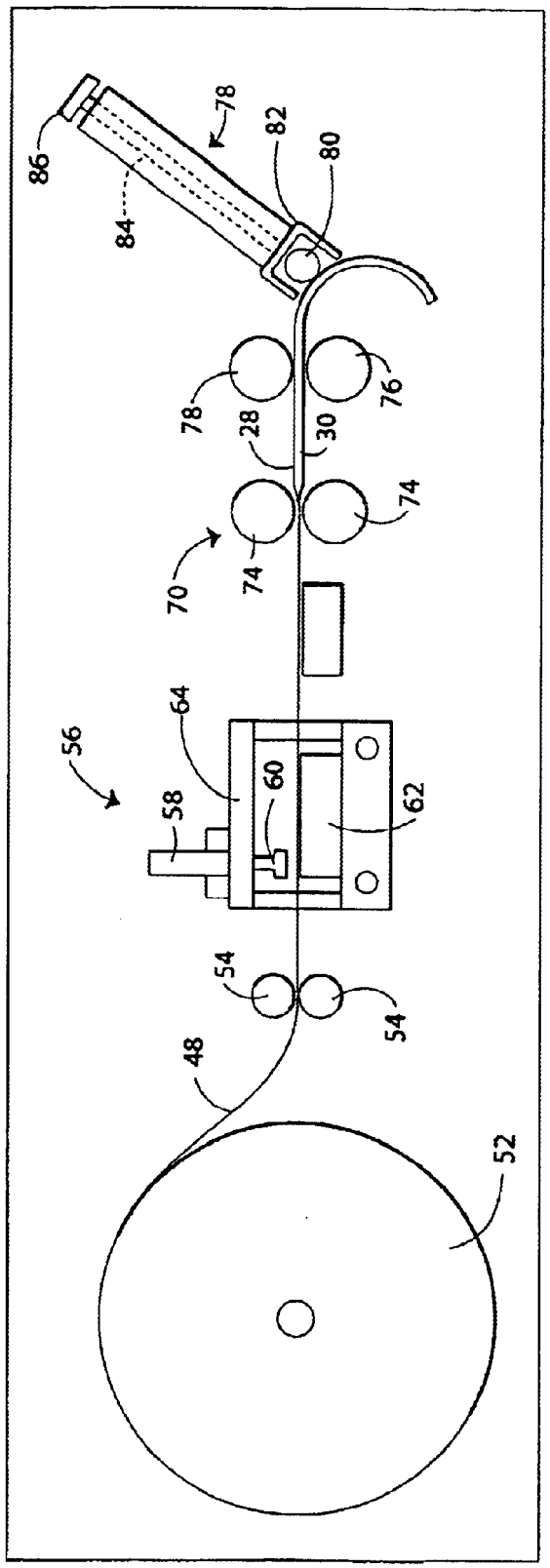
FIG. 3 is a schematic elevational view of an apparatus for manufacturing a channel for the gasket illustrated in FIG. 1.

The channel 26 is cut from an elongate coil formed from a flat metal band 48 using an apparatus 50 schematically illustrated in FIG. 3. The band 48 is a flat metal band having a width of 0.41 inches and a thickness of 0.018 inches provided from a supply 52. The band 48 passes between metering rollers 54 for guiding the band 50 band 48 from the supply 52 to a punch station 56. A sensor tracks the metering rollers to determine the length of the band 48 passing to the punch station 56. The punch station 56 includes a hydraulic cylinder 58 which drives a punch 60 against the band 48 traveling in a guide block 62. In the illustrated embodiment, the hydraulic cylinder 58 mounts to a longitudinally moveable track in a support 64. The hydraulic cylinder 59 together with the punch 60 thereby moves longitudinally relative to the band 48 as it passes through the punch station 56. The purpose of this is to allow the punch 60 to create an opening 90 (see FIG. 4) in the band 48 to facilitate joining opposing distal ends of the channel 26 made with the band, as discussed below. The hydraulic cylinder 58 activates periodically based on the sensor tracking the metering rollers 54. The hydraulic cylinder 58 moves the punch 60 from a retracted position to an extended position bearing firmly against the band 48 in the guide block 62 while also moving the hydraulic cylinder and punch longitudinally with movement of the band 48 through the punch station 56.

The flat band 48 then passes through a first roll forming station 70 and a second roll forming station 72. The roll form stations 70, 72 include respective rollers 74, 76 to roll form the flat band 48 into a channel having a U-shaped cross section with the opposing sides 28, 30 and the base 32. A coil roller assembly 78 is disposed adjacent a discharge of the second roll forming station 72. The coil former 78 includes a roller 80 mounted to a moveable member 82. The member 82 connects by a threaded shaft 84 to an actuator 86. Movement of the actuator 86 causes the member 82 to move longitudinally relative to the threaded shaft 84. This moves the roller 80 relative to the discharge from the second roll form station 72. Changing the position of the roller 80 relative to the roll form station 72 adjusts the diameter of the coil of the U-shaped channel roll formed in the roll form station 70, 72.

Figure 4:
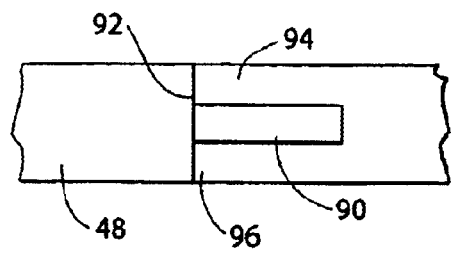
FIG. 4 is a top plan view of a portion of a band used in forming the gasket of the present invention.

FIG. 4 is a top plan view of the band 48 immediately after passing through the punch station 56. The punch 60 creates an opening 90 in the band 48. In addition, the punch 60 includes a blade that defines a score 92 transverse to a longitudinal access of the band 48 at an edge of the punched opening 90. The opening 90 defines legs 94, 96 in the band 48. The opening 90 and the score 92 are punched at periodic intervals in the band 48 depending on the diameter of the gasket plate 12 to receive the U-shaped channel, and based on the sensor tracking the metering rollers 54.

Figure 5:
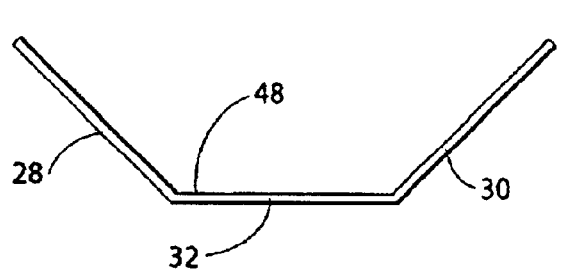
FIGS. 5 and 6 illustrate cross sectional views of the band during roll forming of a U-shaped channel used in the gasket illustrated in FIG. 1.

FIG. 5 is a cross-sectional view of the band 48 after exiting the first roll form station 70. The side portions of the band 48 have been partially rolled to form a wide U-shape (cross-section) in the band 48.

Figure 6:
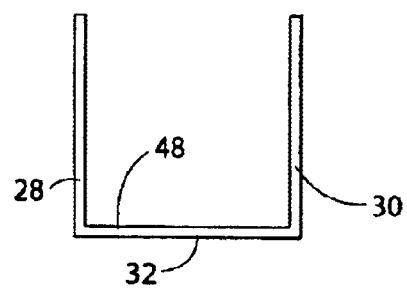

FIG. 6 illustrates a cross-sectional view of the band 48 after passing through the second roll form station 72, in which the side walls 28, 30 are substantially parallel or tapered slightly inwardly so that the side walls 28, 30 make contact with the sealing surface of the plate 12.

Figure 7:
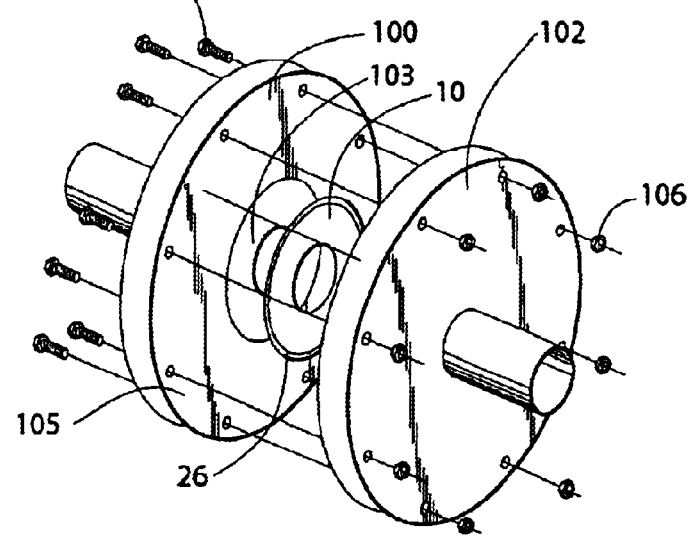
FIG. 7 is a perspective view of a flange connection of pipes sealed by the gasket in illustrated in FIG. 1.

FIG. 7 is a perspective exploded view of a connection between two flanged components 100, 102 using the gasket 10 of the present invention. The flanges 100 include projecting flange contact faces 103. The flanges define a plurality of openings through which bolts 104 pass and engage nuts 106. FIG. 7 illustrates one of the plurality of bolts 104 and nuts 106. The sealing face 103 is slightly raised relative to the flange 100, which defines a recessed portion 105.

With reference to FIG. 3, the channel 26 is formed by feeding the flat band 48 from the supply 52 past the metering rollers 54 and the punch station 56. Periodically, the hydraulic cylinder 58 activates, depending upon the length of the channel necessary to extend around the perimeter of the plate 12. The punch cuts the opening 90 in the band 48. The blade attached to the punch forms the score 92. The score 92 is used to guide the separation of the channel 26 from the coil formed by the apparatus 50. The hydraulic cylinder 52 moves longitudinally with the moving band 48 during the punching process. Once the opening 90 is formed, the punch 60 retracts and returns to a starting position in the punch station 56.

The first and second roll form station 70, 72 bend or roll form the side portions of the band 48 to bring the side walls 28, 30 upward to form the U-shaped channel, as illustrated in FIGS. 5 and 6. The roller 80 in the coil forming station 78 bears against the outer face of the base 32 in order to arcuately guide the roll formed channel into a coil 82 of a selected diameter. The coil 82 is then painted, such as with a luminescent yellow, orange, or other bright paint, to facilitate visual identification of the gasket in the sealed flange connection after installation.

The gasket 10 is thereafter assembled by receiving the gasket plate 12, such as a gasket formed by the apparatus and method disclosed in U.S. patent application Ser. No. 09/119,984 described above. The channel 26 is separated from the coil by breaking or cutting at the score 92. This is accomplished by hand bending or with pliers or wire cutters. The channel 26 is then threaded or wrapped rotatingly or threadingly about the perimeter of the plate 12. As illustrated in FIG. 2, the sidewalls 28, 30 extend over the edge portions of the sealing surfaces 18. In FIG. 2, the sidewalls 28, 30 are illustrated spaced slightly apart from the sealing surface 18; in practice however the sidewalls 28, 30 may be in snug contact with the edge portion of the sealing surfaces 18, 20. The distal ends 36, 38 of the channel 26 are brought together with the legs 94, 96 overlapping the opposing distal end of the channel 26. The overlapping distal ends 36, 38 are then secured together, such as with the weld 40. This secures the channel 26 about the perimeter of the plate 12. The channel 26 provides additional mass and stiffening to the plate 12 and effects a change in the natural frequency of the plate. Appropriate indicia 34 is printed on the exterior face of the base 32. The indicia 34 may be painted, such as with an ink jet device, attached with a sticker, or embossed.

The gasket 10 is used to seal flange connections such as that illustrated in FIG. 7. The opposing flanges 100, 102 are brought together and fastening bolts 104 with nuts 106 (FIG. 7 illustrates one of the plurality of the bolts and nuts). In the illustrated connection, the nuts and bolts in the bottom portion of the flange connection are initially placed to bring the flanges 100, 102 close together. The gasket 10 is then inserted between the flange faces whereby the sealing surfaces 18 are aligned with the sealing face 103 of the respective flanges 100, 102. The channel 26 of the gasket 10 is disposed outwardly of the sealing faces 103 in recessed portions 105 of the flanges 100, 102 generally in close proximity to the bolt holes in the flange. The channel 26 is therefore not held by the sealing faces of the flanges and is not under loading by the bolts that connect the flanges together. The remaining bolts and nuts are installed and tightened to bring the flanges 100, 102 together and effect a seal with the sealing surfaces 18 of the gasket 10. During use of the gasket 10, the channel 26 changes the natural frequency of the plate 12 and thereby avoids resonance of the plate in the flange connection. This reduces the potential for the plate to fail or sealing material to dislodge with the potential risk of failure of the plate, particularly resulting from uneven flange loading. The flanges 100, 102 typically have a slight gap for visual identification and verification of the gasket 10 sealing the flange connection.

It is to be appreciated that the gasket 10 of the present invention further facilitates handling of the gasket and its sealing material. During installation, should the gasket 10 be dropped, the channel 26 protects the plate 12 and the sealing material 24 from damage by the floor or ground. During storage and handling of gaskets in inventory, the channel 26 protects the surfaces of the plate and the sealing material from damage by inadvertent contact.

It is thus seen that an improved gasket to seal a flange connection and having an outer diameter channel that changes the natural frequency of the gasket to avoid resonance in the flange connection, particularly resulting from uneven flange loading, with enhanced visual acknowledgement of proper gasket installation, constuction and materials, is provided, together with an apparatus and method for manufacturing such gaskets and channels for such gaskets. While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, many modifications, variations and changes may be made by those skilled in the art without departure from the spirit and scope of the invention as described by the following claims.

What is claimed is:

1. A gasket for sealing flange connections in piping systems for media while changing a natural frequency of the gasket to avoid resonance in the flange connection, comprising a plate that defines a opening therein for passage of media through the flange connection sealed with the plate, with opposing sealing surfaces between an edge of the opening and an outer portion of the plate, and a channel secured around an outer perimeter edge of the plate, a first distal end of the channel defining a notch to overlap a portion of an opposing second distal end and secured thereto to join the channel rigidly together.

2. The gasket as recited in claim 1, wherein the channel defines a outer face about the perimeter of the plate for receiving indicia representative of the gasket, whereby visual inspection of a flange connection is facilitated.

3. The gasket as recited in claim 1, further comprising a jacket of a sealing material overlying the sealing surfaces of the plate.

4. The gasket as recited in claim 3, wherein the jacket comprises a plurality of expanded intercalated graphite worms.

5. The gasket as recited in claim 1, wherein the plate defines a plurality of corrugations about the opening.

6. The gasket as recited in claim 5, in which the corrugations are between about 4 and 8 corrugations per inch.

7. The gasket as recited in claim 1, wherein the channel has a base and substantially parallel spaced-apart side walls extending therefrom, which base has an interior surface that abuts against a radially distal edge of the plate.

8. The gasket as recited in claim 1, wherein the opposing distal ends of the channel join together rigidly by welding the overlapped portions thereof.

9. A method of sealing a flange connection with a plate while changing a natural frequency of the plate to avoid resonance in the flange connection, comprising the steps of:
   (a) disposing a channel about a perimeter edge of the plate to form a gasket;
   (b) positioning the gasket within a flange connection with the plate between sealing faces of opposing flanges and the channel received in recess portions thereof; and
   (c) loading the plate to effect the seal without loading the channel, whereby the channel being unloaded but in engagement to the plate changes a natural frequency of the plate to avoid resonance in the flange connection.

10. The method as recited in claim 9, further comprising the step of marking identifying indicia on an exterior face of the channel, whereby visual acknowledgement of the sealed flange connection is enhanced.

* * * * *